June 4, 1940.  M. J. ESPELTA  2,203,459

NONSKID AND BRAKING DEVICE FOR VEHICLES

Filed May 25, 1939  2 Sheets-Sheet 1

INVENTOR.
Manuel J. Espelta
BY Lancaster, Allwine Rommel
ATTORNEYS.

June 4, 1940.　　　　M. J. ESPELTA　　　　2,203,459
NONSKID AND BRAKING DEVICE FOR VEHICLES
Filed May 25, 1939　　　　2 Sheets-Sheet 2

INVENTOR.
Manuel J. Espelta
BY Lancaster, Allwine and Rommel
ATTORNEYS.

Patented June 4, 1940

2,203,459

UNITED STATES PATENT OFFICE 2,203,459

NONSKID AND BRAKING DEVICE FOR VEHICLES

Manuel J. Espelta, Franklinville, N. J.

Application May 25, 1939, Serial No. 275,733

8 Claims. (Cl. 188—5)

The invention relates to improvements in nonskid devices for vehicles and more particularly to ground-engaging and braking mechanism for vehicles.

An object of the invention is to provide ground-engaging wheeled nonskid and braking means adapted for use in conjunction with a vehicle traveling over uneven or irregular roadways.

Another object of the invention is to provide a flexibly or resiliently mounted ground-engaging and braking mechanism.

A further object lies in the provision of ground-engaging and braking mechanism for attachment to a vehicle in a manner whereby tilting of the mechanism, as well as lateral and longitudinal movement of the mechanism relative to the vehicle, is permitted.

A still further object resides in the provision of a nonskid braking device with improved means for vertically adjusting the device between positions of engagement and disengagement with the ground.

Yet another object of the invention is to provide a nonskid device of the character described with braking means and means to automatically apply the braking means upon engagement of the device with the ground or roadway.

Other objects and advantages of the invention will be apparent from the following detailed description, taken in connection with the accompanying drawings forming a part of this specification and in which drawings—

In the drawings, which for the purpose of illustration show only a preferred embodiment of the invention and wherein similar reference characters denote corresponding parts throughout the several views, A designates a vehicle chassis provided with my improved nonskid and braking device B.

Figure 1:
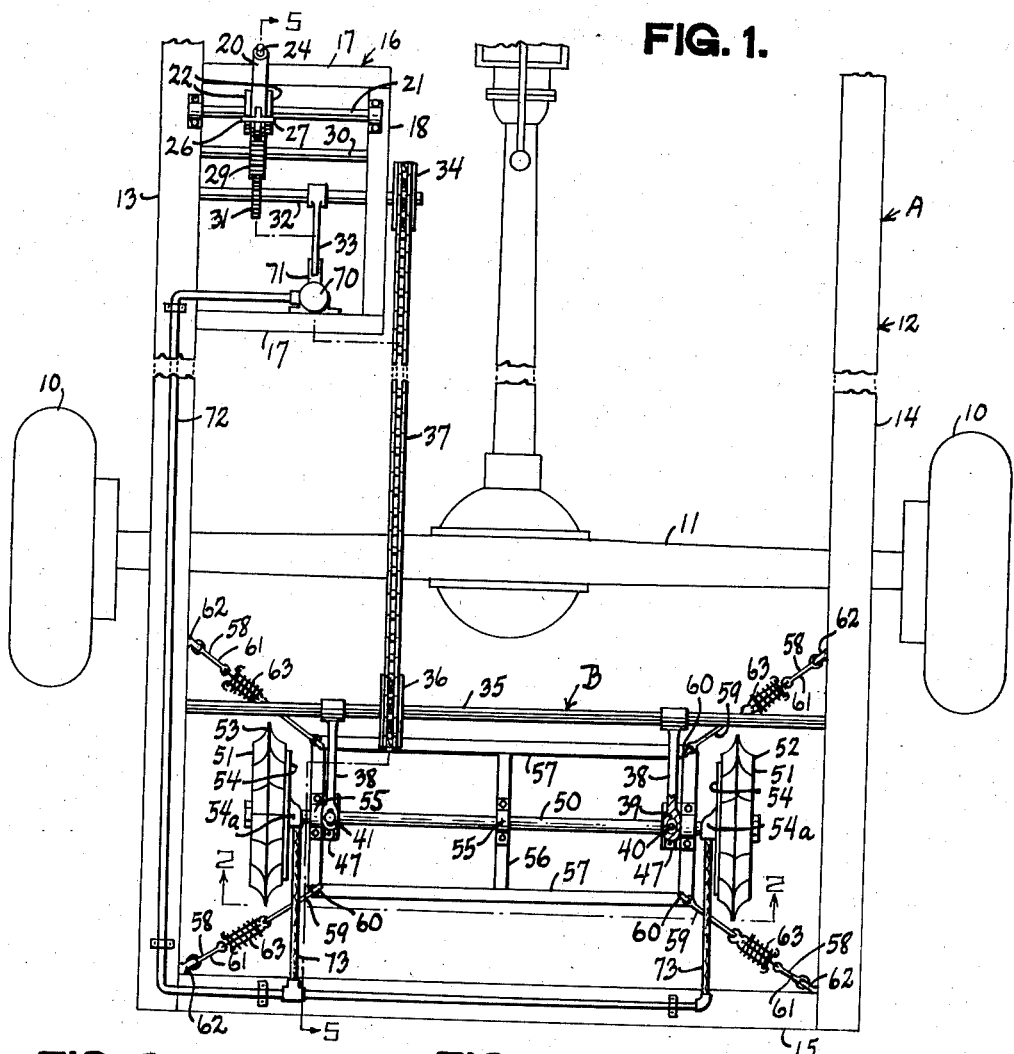
Figure 1 is a fragmentary top plan view of the rear end portion of a vehicle chassis provided with my improved nonskid and braking device.
Figures 2, 3:
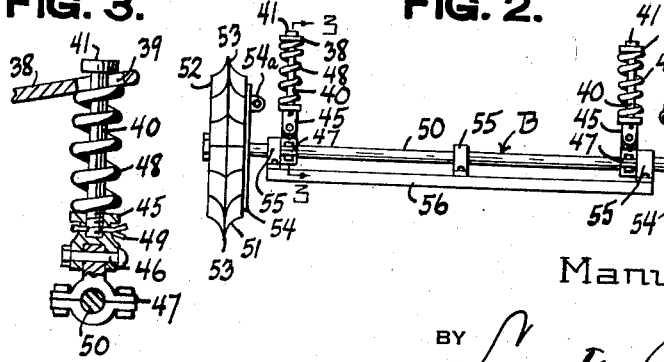
Figure 2 is a view substantially on the line 2—2 of Figure 1.
Figure 3 is a vertical sectional view substantially on the line 3—3 of Figure 2.
Figure 4:
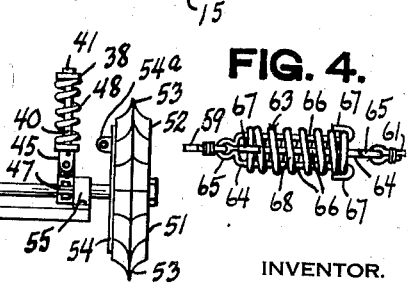
Figure 4 is a plan view of a resilient spring structure preferably forming a part of my nonskid device.

While the vehicle chassis A may be of any suitable form, it includes, in the example shown, the usual rear wheels 10, axle structure 11, and frame 12 having side rails 13, 14 and cross rail 15. The frame 12 may also include a bracket 16 comprising inwardly projecting rails 17 provided at their inner end portions with a connecting rail 18.

Referring now to the nonskid and braking device B, the same may comprise a hand lever 20 mounted for rotation on a shaft 21 fixed on the frame 12 and bracket 16. Suitable means may be employed to secure the hand lever 20 in any of a plurality of positions. In the example illustrated, there is fixed on the shaft 21 a pair of notched half wheels 22, one on each side of the hand lever. Reciprocably mounted for movement longitudinally of the hand lever 20 is a rod 23 provided with a button 24 urged outwardly of the hand lever 20 as by a spring 25. Pivotally mounted on the lever 20 is a T-shaped pawl 26 including a stem 26ª pivotally connected to the rod 23 and a cross bar 27 forming laterally offset projections for releasable engagement with the notched half wheels 22. Engagement of the cross bar 27 with the notched half wheels 22 will secure the hand lever 20 in one of a plurality of adjusted positions. Preferably integral with the hand lever 20 is a sector gear 28 meshing with pinion gear 29 on shaft 30. Meshing with the pinion gear 29 is a spur gear 31 fixed to shaft 32, which latter is rotatably mounted in frame 12 and bracket 16. Fixed for movement with the shaft 32 is a brake lever 33 and sprocket wheel 34.

Rotatably mounted transversely of the frame 12 and preferably rearwardly of the axle structure 11 is a rock shaft 35. Fixedly mounted on the rock shaft is a sprocket wheel 36 connected for movement with sprocket wheel 34 as by chain 37. Also fixed for movement with the rock shaft 35 are spaced apart arms 38 provided at their free end portions with elongate slots 39. Extending loosely through these slots 39 are hanger rods 40 of a diameter less than the width of the elongate slots, each hanger rod being provided at its upper end with an enlarged head 41 serving to limit downward movement of the hanger rod. Each hanger rod at its lower end is screw threadedly connected to a clevis 45 provided with a cross pin 46 for pivotally supporting a split bearing 47. Encircling each hanger rod between the clevis 45 and arm 38 is a contractile coil spring 48 for urging the clevis and arm apart. A cotter pin 49 may serve to secure the clevis and hanger rod against accidental separation.

Rotatably mounted in the bearings 47 is an axle shaft 50 on the opposite end portions of which are mounted relatively freely rotatable wheels 51. These wheels may include a drum-like housing portion 52 and a series of circumferentially spaced spikes 53 radiating outwardly from the housing portion. Fixed on the axle shaft 50 inwardly adjacent each drum-like housing 52 is a plate 54 for carrying any suitable form of hydraulically operated brake mechanism 54a. This brake mechanism 54a may be of the type shown and described in U. S. Patent 2,124,761 to Carroll et al.

Fixed against rotation relative to the axle shaft 50, as by clamps 55, is a rectangular frame 56 having sections 57 disposed at opposite sides of the shaft, and resiliently supported, as by connectors 58 extending outwardly and upwardly from the corners of the rectangular frame 56 to portions of the vehicle frame. In the example shown, each connector 58 comprises a length 59 of wire secured at one end to an eye 60 at a corner of thhe frame 56, a length 61 of wire secured at one end to an eye 62 of the vehicle frame, and a spring device 63 joining the opposite ends of the lengths 59 and 61 of wire. Each spring device 63 may comprise a pair of U-shaped wires 64 disposed in planes intersecting in a given line coinciding with the longitudinal axes of the wires 64. The bight portions of the U-shaped wires 64 form eyes 65 at opposite ends of the spring device 63 for attachment of the lengths 59 and 61, and the extremities of the leg portions 66 are bent outwardly to form hooks 67 for the retention of a contractile coil spring 68 encircling the leg portions 66.

Figure 6:
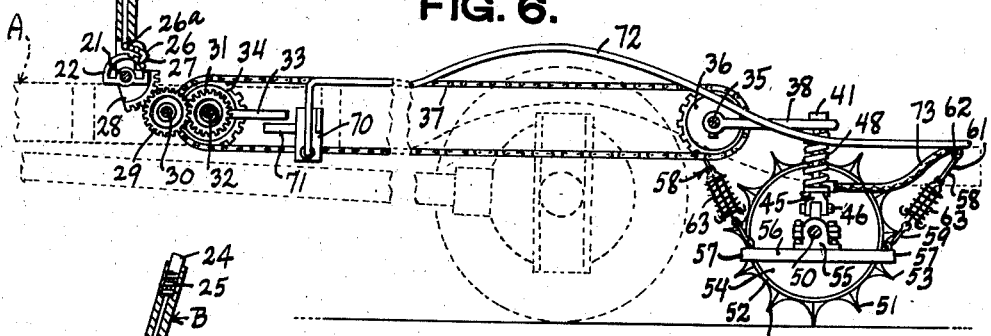
Figure 7:
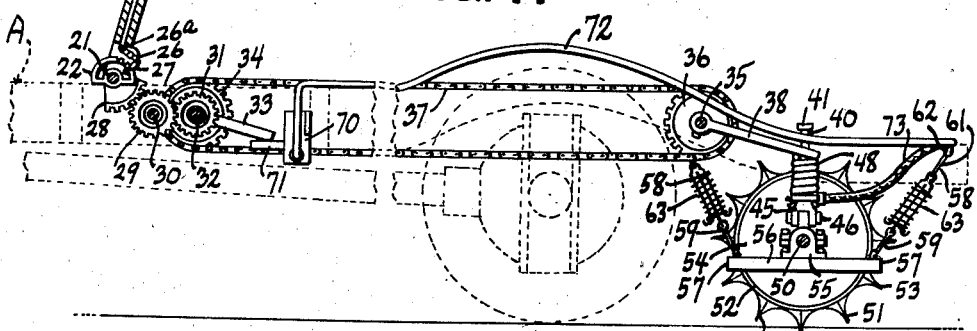

Secured to the bracket 16 is a hydraulic brake cylinder 70, which may be of the type shown and described in U. S. Patent 2,071,297 to Dodge et al, and including an operating arm 71 disposed in the path of travel of the brake lever 33. Extending from the cylinder 70 to the cross rail 15 of the vehicle frame is a fluid conduit 72 including flexible sections 73 connected to the brakes 54a. The relationship of the operating arm 71 to the brake lever 33 is illustrated in Figures 5, 6 and 7.

Figure 5:
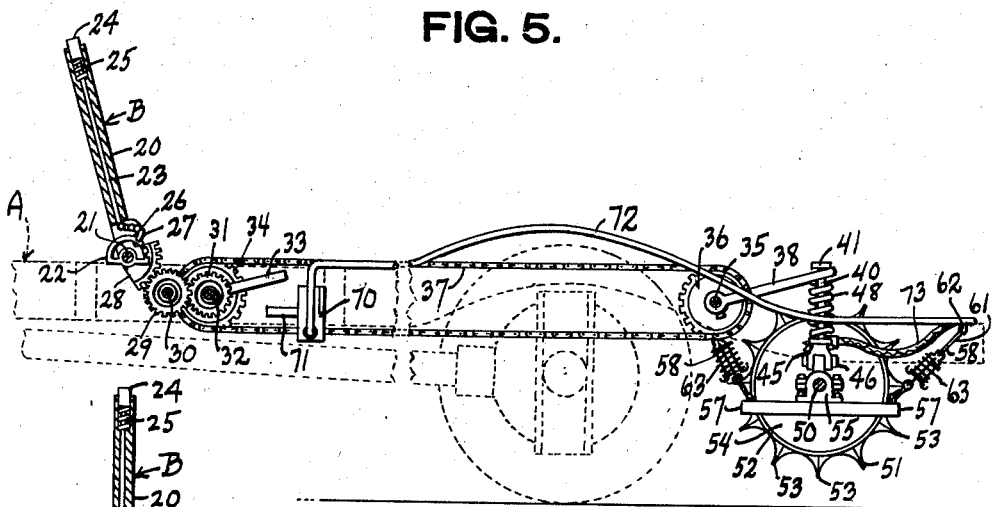
Figures 5, 6 and 7 are diagrammatic views of my nonskid device taken substantially on the line 5—5 of Figure 1, with portions of the vehicle shown in broken lines, and showing the device disposed in positions of disengagement, partial engagement and full engagement, respectively, with the ground or roadway.

In the operation of a vehicle A equipped with my non-skid and braking device B, the hand lever 20 is normally inclined forwardly as shown in Figure 5 of the drawings. In traveling over a slippery road, the driver may desire continuous protection against skidding. By pulling the hand lever 20 to the position shown in Figure 6, the spiked wheels 51 are lowered into engagement with the ground or roadway, the relationship of parts being such that the brake lever 33 is out of operative engagement with the arm 71 of the hydraulic cylinder 70 so that the wheels 51 will not appreciably retard the vehicle. Should it become necessary to slow down or stop either gradually or quickly, the hand lever 20 is pulled back still further until the brake lever 33 depresses the arm 71 of the hydraulic cylinder 70 an amount sufficient to apply the brakes either slightly or completely, as shown in Figure 7. It will be noted that in pulling back the hand lever to apply the brakes to the spiked wheels 51, the arms 38 are downwardly swung to compress the coil springs 48 whereby to engage the spiked wheels with the ground or roadway with a resilient force varying in accordance with the degree of application of the brakes. It will also be noted that in the prevention of a side skid or in the application of the brakes, the resilient or flexible connection of the nonskid and braking device B to the vehicle A will permit a certain amount of relative movement between the device B and vehicle A, either longitudinally or laterally. In the application of the brakes, the resilient or flexible connection of the braking device B to the vehicle A will also permit the rectangular frame 56, normally substantially parallel with the ground or roadway to tilt a limited degree due to the torque transmitted from the rotating spiked wheels to the rectangular frame 56 through the applied brakes. This resilient or flexible connection of the nonskid and braking device to the vehicle tends to prevent stopping of the vehicle too abruptly and tends to eliminate overturning of the vehicle during a lateral skid.

Various changes may be made in the form of invention herein shown and described without departing from the spirit of the invention or the scope of the following claims.

I claim:

1. In combination with a vehicle structure, spaced members provided with slots, hanger rods extending loosely through said slots for swinging and sliding movement relative to said spaced members, bearings pivotally connected to said hanger rods, spring means urging said spaced members and bearings apart, an axle mounted for rotation in said bearings, spaced wheels mounted for rotation on said axle, a frame fixed on the axle and including sections at opposite sides of the axle, resilient means connecting said opposite sections to the vehicle structure, and means for vertically adjusting said frame to engage or disengage said wheels with the ground.

2. In combination with a vehicle structure, spaced members provided with slots, hanger rods extending loosely through said slots for swinging and sliding movement relative to said spaced members, bearings pivotally connected to said hanger rods, spring means urging said spaced members and bearings apart, an axle mounted for rotation in said bearings, spaced wheels mounted for rotation on said axle, brake mechanism for each wheel, a frame fixed on the axle and including sections at oposite sides of the axle, resilient means connecting said opposite sections to the vehicle structure, means for vertically adjusting said frame between positions wherein said wheels engage and disengage the ground, and means to engage and disengage said brake mechanism.

3. In combination with a vehicle structure, spaced members provided with slots, hanger rods extending loosely through said slots for swinging and sliding movement relative to said spaced members, bearings pivotally connected to said hanger rods, spring means urging said spaced members and bearings apart, an axle mounted for rotation in said bearings, spaced wheels mounted for rotation on said axle, brake mechanism for each wheel, a frame fixed on the axle and including sections at oposite sides of the axle, resilient means connecting said opposite sections to the vehicle structure, means for vertically adjusting said frame between positions wherein said wheels engage and disengage the ground, and means to automatically set and release the brake mechanism through the operation of said frame adjusting means to dispose said wheels in and out of engagement with the ground.

4. In combination with a vehicle structure, a rock shaft, a control member operatively connected to the rock shaft, spaced arms fixed on the rock shaft, hanger rods connected to said spaced arms for swinging movement, bearings pivotally connected to said hanger rods, an axle mounted for rotation in said bearings, spaced wheels mounted for rotation on said axle, a frame fixed on the axle and including sections at opposite sides of the axle, and resilient means connecting said sections to said vehicle structure.

5. In combination with a vehicle structure, a rock shaft, a control member operatively connected to the rock shaft, spaced arms fixed on the rock shaft, hanger rods connected to said spaced arms for swinging and sliding movement, bearings pivotally connected to said hanger rods, spring means urging said arms and bearings apart, an axle mounted for rotation in said bearings, spaced wheels mounted for rotation on said axle, a frame fixed on the axle and including sections at opposite sides of the axle, and resilient means connecting said sections to said vehicle structure.

6. In combination with a vehicle structure, a rock shaft, control means operatively connected to the rock shaft, spaced arms fixed on the rock shaft, hanger rods connected to said spaced arms for swinging and sliding movement, bearing pivotally connected to said hanger rods, spring means urging said arms and bearings apart, an axle mounted for rotation in said bearings, spaced wheels mounted for rotation on said axle, brake mechanism for each wheel, said control means being operatively connected to said brake mechanism, a frame fixed on the axle and including sections at opposite sides of the axle, and resilient means connecting said sections to said vehicle structure.

7. In combination with a vehicle structure, a control member, means to releasably fix the control member in any one of a plurality of positions of adjustment, a brake lever mounted for movement with said control member, a rock shaft, means transmitting motion from said control member to said rock shaft, spaced arms fixed on the rock shaft, hanger rods connected to said spaced arms for swinging and sliding movement, bearings pivotally connected to said hanger rods, spring means urging said arms and bearings apart, an axle mounted for rotation in said bearings, spaced wheels mounted for rotation on said axle, brake mechanism for each wheel and operable by said brake lever, a frame fixed on the axle and including sections at opposite sides of the axle, and resilient means connecting said sections to said vehicle structure.

8. In combination with a vehicle structure, a control member, means to releasably fix the control member in any one of a plurality of positions of adjustment, a sector gear mounted for oscillation with said control member, a spur gear, a pinion gear meshing with said spur and sector gears, a sprocket mounted for movement with said spur gear, a brake lever mounted for movement with said sprocket, a rock shaft, a sprocket fixed on the rock shaft, means for transmitting motion between said sprockets, spaced arms fixed on the shaft, hanger rods connected to said spaced arms for swinging and sliding movement, bearings pivotally connected to said hanger rods, spring means urging said arms and bearings apart, an axle mounted for rotation in said bearings, spaced wheels mounted for rotation on said axle, brake mechanism for each wheel and operable by said brake lever, a frame fixed on the axle and including sections at opposite sides of the axle, and resilient means connecting said sections to said vehicle structure.

MANUEL J. ESPELTA.